Patented May 1, 1951

2,550,726

UNITED STATES PATENT OFFICE 2,550,726

VITAMIN COATED SALT

Merton A. Searle, St. Paul, Minn.

No Drawing. Application October 13, 1947,
Serial No. 779,639

8 Claims. (Cl. 99—143)

My invention relates to an improvement in vitamin coated salt wherein it is desired to coat granular particles of table salt with vitamin compositions.

It is common knowledge that many foods lose some of their vitamin content during cooking processes. As a result the diet of many persons is deficient in certain vitamins. This deficiency is often made up by taking pills containing the necessary vitamins. If the vitamins are not thoroughly intermixed with food in a natural manner, it is necessary to provide pills containing greatly in excess of the required amount of vitamins in order that the necessary amount be retained. Thus many times the necessary amount of a vitamin preparation is taken resulting in a considerable expense and unnecessary waste. Vitamins are added to many food products now produced but often the value of these vitamins is destroyed by a later cooking process.

It is the object of the present invention to mix vitamins with ordinary table salt and to use the combination in exactly the same manner as table salt is usually used at the present time. As a result the vitamins are added to the food together with the table salt after the cooking process is complete, thereby assuring the consumption of the proper amount of vitamins in the diet.

A feature of the present invention lies in providing vitamins with an indicator capable of indicating the necessary amount of vitamins to be consumed. The average individual uses table salt at each meal, and while the quantity of salt varies under varying conditions, the average amount of salt used each day by the average individual may be computed. By adding to this average amount of salt, used daily by the average individual, the daily requirement of one or more vitamins, the person using the salt may be assured of the proper amount of vitamins in this diet.

A feature of the present invention lies in the fact that while some persons use more salt than others, the dosage of vitamins is such that the amount used even by a person consuming a maximum amount of salt is not harmful. A person using more than the average amount of salt will consume slightly more than the average amount of vitamins, while a person using less salt than normal will have a diet slightly deficient in vitamins. However, as no individual will depend upon the salt as a total source of vitamins, the salt will be beneficial in every case.

It is a feature of the present invention to provide vitamins in combination with a material which can be consumed only in limited quantities. While the amount of salt consumed by various persons differs, it only differs within definite limits as the amount of salt which can be tolerated if the food is to be palatable is definitely limited. Thus the salt provides an indicator for preventing the use of an excessive amount of vitamins, thus saving expense by preventing over indulgence in vitamins.

An added feature of the present invention resides in the manner in which the vitamins are applied to the granules of salt. The vitamins are ground to a powder which is fine relative to the particle size of the salt. By intermixing the vitamins and the salt, the vitamins appear to adhere to the surface of the salt granules, thus forming a coating thereupon. This feature is of extreme importance as if the powder did not coat the salt particles it would be necessary to grind the salt particles to the same size as the vitamin particles to prevent separation therebetween. If a powdered material is added to the salt granules, and the mixture agitated, the powder particles will tend to separate from the salt particles and collect at the bottom of the container. However, the vitamins in finely divided form have a tendency to cling to the salt particles and to coat the same, thereby insuring proper mixture between the vitamins and the table salt and preventing separation between these elements.

These and other objects and novel features of the present invention will be more clearly and fully set forth in the following specification and claims.

In carrying out the present invention it is desirable that the average amount of salt used by an individual per day be computed as nearly as possible. The average amount of salt consumed per person per month was found statistically to be approximately six ounces. If half of this salt consumed is used as table salt, the average individual consumes about three ounces of table salt per month. While this average amount may vary depending upon the amount of salt previously added to the food, the above amount seemed to be a fair average of the salt added to the food.

According to the Medical Dictionary, the use of three hundred units per day of vitamin $B_1$ (thiamin chloride) was recommended. One milligram of vitamin $B_1$ contains 330 units. An individual should have 300 times 30 or 9000 units of vitamin $B_1$ per month. The proper proportion of vitamin $B_1$ may be attained by mixing one pound of vitamin $B_1$ with 3,333 pounds of ordinary table salt (sodium chloride). On mixing the vitamins with the table salt in the above proportion it was found that the granules of salt could be coated with the vitamins. The vitamins used are in a finely divided powder form and have an affinity for the granules of salt. Accordingly there is no separation between the vitamins and the salt particles even though particle size differs substantially. In this respect the applicant's experiments differed materially in results from the results obtained by adding other powdered material to the salt granules. In every other case where such compositions were combined the powdery material had a tendency to separate from the salt granules and to settle to the bottom of the container as the container was handled.

According to authorities, a person should consume about one and one half times as much vitamin $B_2$ (Riboflavin) as vitamin $B_1$. In order to add the proper amount of vitamin $B_2$ to the salt, approximately one and one half pounds of vitamin $B_2$ should be mixed with 3333 pounds of salt. About ten times the quantity of vitamin C is required in the daily diet as is required of vitamin $B_1$. Therefore, to produce the proper quantity of vitamin C, about ten pounds thereof should be mixed with 3333 pounds of table salt.

In carrying out a specific example of my combination, vitamin $B_1$ and vitamin $B_2$ were combined in the proportion of one and one-half parts of vitamin $B_2$ to one part of vitamin $B_1$. The vitamin $B_2$ is bright yellow in color and its combination with the vitamin $B_1$ acts to provide a modified yellow color. Ten parts of vitamin C, may also alternatively be added per one part of vitamin $B_1$.

The combined vitamins are next added to table salt in the proportion of twelve and one-half parts of the vitamin mixture to 3,333 parts of table salt. The mixture is next agitated thoroughly. After agitation it will be found that the finely powdered vitamin composition adheres to the individual particles of table salt imparting a yellow color to the salt and producing a vitamin content in the salt which will give the average salt consumer his normal daily requirements of vitamins $B_1$ and $B_2$. The above mixture will provide 300 U. S. P. units of vitamin $B_1$ and sufficient vitamin $B_2$ and vitamin C to meet normal daily requirements. The color imparted to the salt makes the salt easily recognizable from other salt not containing vitamins. If sufficient salt is added to the food to render the same almost unpalatable, the amount of vitamins employed would not be harmful. Thus while a certain amount of the vitamins would be wasted if more than the normal amount of salt is used on the food, the amount of vitamins wasted would not be anywhere near the usual amount wasted if vitamins are taken in pill or tablet form.

I have found that by placing the salt in a container having transparent sides so that the contents of the shaker can be seen, the salt and vitamins may be evenly distributed over the food in finely divided portions. As a result the vitamins will remain in the food and more good will be obtained therefrom than when vitamins are taken in tablet form. By finely dividing the vitamin particles as described, the vitamins are slowly dissolved and assimilated, resulting in a higher retention in the body.

As a second example of a mixture which has been found satisfactory for use, I may describe the following:

One part of vitamin $B_1$ and one and one-half parts of vitamin $B_2$ are added to 2000 parts of ordinary table salt. The ingredients are mixed as previously described in conjunction with Example 1. The resulting product is possessed of a much yellower color and the vitamin content is of course considerably increased. This combination has been found particularly useful for persons who use an extremely small amount of salt or for persons who only use salt of the type described twice a day.

As a third example of a composition which has been found acceptable for use, I may give the following:

One part of vitamin $B_1$ is mixed with one and one-half parts of vitamin $B_2$ and 4500 parts of ordinary table salt. This composition is mixed as described in Example 1 above and the vitamin powder coats the granules of salt.

The preparation described in Example 3 is particularly useful for persons who use a considerable quantity of salt or for persons who do not need the full requirements of the vitamin $B_1$ and $B_2$ in the salt.

Vitamin C could be added to Examples 2 and 3 above in the proportion of 10 parts of vitamin C to 1 part of vitamin $B_1$. Similarly any of the vitamins above may be singly added to the salt, or a combination of any two thereof may be used.

In accordance with the patent statutes, I have described the principles of composition and use of my vitamin coated salt, and while I have endeavored to set forth the best embodiment thereof, I desire to have it understood that obvious changes may be made within the scope of the following claims without departing from the spirit of my invention.

I claim:

1. As a new product, table salt in granular form, said table salt having the surface of each salt granule uniformly coated with a powdered vitamin selected from the class consisting of vitamin $B_1$, vitamin $B_2$, vitamin C and mixtures thereof, the particles of said powdered vitamin being small relative to the granules of the salt.

2. A product in accordance with claim 1 in which the vitamin is $B_1$.

3. A product in accordance with claim 1 in which the vitamin is $B_2$.

4. A product in accordance with claim 1 in which the vitamin is C.

5. A product in accordance with claim 1 in which the vitamin is a mixture of $B_1$ and $B_2$.

6. A product in accordance with claim 1 in which the vitamin is a mixture of $B_1$, $B_2$, and C.

7. A product in accordance with claim 1 where the vitamin is a mixture of $B_1$ and $B_2$, the mixture being substantially one and one-half parts of $B_2$ to one part of vitamin $B_1$.

8. A product in accordance with claim 1 wherein the vitamin is a mixture of $B_1$, $B_2$, and C, the mixture being composed substantially of these vitamins in the proportions of one and one-half parts of vitamin $B_2$ to one part of vitamin $B_1$ and ten parts of vitamin C to one part of vitamin $B_1$.

MERTON A. SEARLE.

REFERENCES CITED

The following references are of record in the file of this patent:

UNITED STATES PATENTS

| Number | Name | Date |
| --- | --- | --- |
| 352,465 | Hughes | Nov. 9, 1886 |

FOREIGN PATENTS

| Number | Country | Date |
| --- | --- | --- |
| 12,063 | Great Britain | Dec. 3, 1892 |
| 350,684 | Great Britain | June 18, 1931 |